US011763470B2

(12) United States Patent
Chai

(10) Patent No.: US 11,763,470 B2
(45) Date of Patent: Sep. 19, 2023

(54) METHOD AND APPARATUS FOR ALIGNING IMAGE FRAMES, ELECTRONIC DEVICE AND STORAGE MEDIUM

(71) Applicants: Beijing Xiaomi Mobile Software Co., Ltd. Nanjing Branch, Jiangsu (CN); Beijing Xiaomi Mobile Software Co., Ltd., Beijing (CN)

(72) Inventor: Pengshuai Chai, Beijing (CN)

(73) Assignees: Beijing Xiaomi Mobile Software Co., Ltd., Nanjing Branch, Nanjing (CN); Beijing Xiaomi Mobile Software Co., Ltd., Beijing (CN)

( * ) Notice: Subject to any disclaimer, the term of this patent is extended or adjusted under 35 U.S.C. 154(b) by 329 days.

(21) Appl. No.: 17/199,032

(22) Filed: Mar. 11, 2021

(65) Prior Publication Data
US 2021/0374979 A1 Dec. 2, 2021

Related U.S. Application Data

(63) Continuation of application No. PCT/CN2020/093508, filed on May 29, 2020.

(51) Int. Cl.
*G06K 9/00* (2022.01)
*G06T 7/33* (2017.01)
*G06T 7/70* (2017.01)

(52) U.S. Cl.
CPC .............. *G06T 7/337* (2017.01); *G06T 7/344* (2017.01); *G06T 7/70* (2017.01); *G06T 2207/20021* (2013.01); *G06T 2207/20221* (2013.01)

(58) Field of Classification Search
CPC ........................................... G06T 2207/10016
See application file for complete search history.

(56) References Cited

U.S. PATENT DOCUMENTS

2012/0051730 A1   3/2012   Côte et al.
2014/0284449 A1   9/2014   Uchida
(Continued)

FOREIGN PATENT DOCUMENTS

CN   103559722 A   2/2014
CN   107016695 A   8/2017

OTHER PUBLICATIONS

European Patent Office, Partial Extended European Search Report Issued in Application No. 20824070.5, dated Sep. 27, 2021, Germany, 29 pages.
(Continued)

*Primary Examiner* — Hadi Akhavannik
(74) *Attorney, Agent, or Firm* — Finnegan, Henderson, Farabow, Garrett & Dunner, L.L.P.

(57) ABSTRACT

A method for aligning image frames, includes: obtaining a plurality of original image frames, the plurality of original image frames including a reference image frame and a plurality of to-be-aligned image frames; obtaining a brightness image of the reference image frame and a brightness image of each of the to-be-aligned image frames; for each of the to-be-aligned image frames, obtaining at least one mapping model between the reference image frame and the to-be-aligned image frame based on the brightness image of the reference image frame and the brightness image of the to-be-aligned image frame; and aligning the to-be-aligned image frame with the reference image frame based on the at least one mapping model.

18 Claims, 14 Drawing Sheets

(56) References Cited

U.S. PATENT DOCUMENTS

| | | | |
|---|---|---|---|
| 2017/0318233 A1* | 11/2017 | Geiss | G06F 16/5838 |
| 2019/0281215 A1 | 9/2019 | Chan et al. | |
| 2020/0068151 A1* | 2/2020 | Pourreza Shahri | H04N 23/73 |
| 2020/0090417 A1* | 3/2020 | Schloter | G06T 7/33 |

OTHER PUBLICATIONS

ISA State Intellectual Property Office of the People's Republic of China, International Search Report Issued in Application No. PCT/CN2020/093508, dated Feb. 24, 2021, WIPO, 7 pages.

Zhao, Yan et al., "Image matching algorithm based on SIFT using color and exposure information", Journal of Systems Engineering and Electronics, vol. 27, No. 3, Jun. 2016, pp. 691-699.

Anonymous: "OpenCV: Introduction to SIFT (Scale-Invariant Feature Transform)", URL: https://web.archive.org/web/20160708052816/https://docs.opencv.org/3.0.0/da/df5/tutorial_py_sift_intro.htm, Jul. 8, 2016, 3 pages.

Jae Kyu Suhr, "Kanade-Lucas-Tomasi (KLT) Feature Tracker", Computer Vision Lab., Computer Vision (EEE6503), Yonsei Univ. Fall 2009, 36 pages.

Martin A. Fischler et al., "Random Sample Consensus: A Paradigm for Model Fitting with Applications to Image Analysis and Automated Cartography", Communications of the ACM, vol. 24, No. 6, Jun. 1981, pp. 381-395.

Raul ur-Artal et al, "ORB-SLAM2: An Open-Source SLAM System for Monocular, Stereo, and RGB-D Cameras", IEEE Transactions on Robotics, 2017, 26 pages.

Chris Harris et al., "A Combined Corner and Edge Detector", The classical article describing the Harris operator, by Alvey Vision Conference, 1988, 6 pages.

Meng Yi, "Image Registration Based on Feature Point and Its Application to Electronic Image Stabilization", China Doctoral Dissertations Full-text Database, Information Technology, Sep. 2013, 143 pages.

European Patent Office, Extended European Search Report Issued in Application No. 20824070.5, dated Feb. 11, 2022.

Tohl Damian et al: "Image Enhancement Prior to Color Filter Array Demosaicking", TENCON 2018—2018 IEEE Region 10 Conference, IEEE, Jeju, Korea, Oct. 28-31, 2018, 5 pages.

Alleysson D et al: "Linear Demosaicing Inspired by the Human Visual System", IEEE Transactions On Image Processing, IEEE, USA, vol. 14, No. 4, Apr. 1, 2005, 11 pages.

Yi Meng et al: "Improved image alignment algorithm based on projective invariant for aerial video stabilization", KSII Transactions On Internet and Information Systems, vol. 8, No. 9, Sep. 2014, 19 pages.

Xuehua Lin et al: "Application of Triangulation-based Image Registration Method in the Remote Sensing Image Fusion", 2009 International Conference On Environmental Science and Information Application Technology, The Journal of Physical Chemistry C, American Chemical Society, US, Jul. 4, 2009, 4 pages.

Hao-Chun Chien: "On the evaluation of interest point detectors algorithm by using satellite images", URL: https://citeseerx.ist.psu.edu/viewdoc/download?doi=10.1.1.190.8912&rep=rep1&type=pdf, Jan. 1, 2010, 36 pages.

\* cited by examiner

| for the reference image frame and each of the to-be-aligned image frames, obtain an average value of the gray values of pixels in each Bayer unit of each image | ⁓21 |

↓

| obtain the brightness image of each image by taking an average value corresponding to each Bayer unit as a gray value of a pixel | ⁓22 |

FIG. 2

METHOD AND APPARATUS FOR ALIGNING IMAGE FRAMES, ELECTRONIC DEVICE AND STORAGE MEDIUM

CROSS REFERENCE TO RELATED APPLICATIONS

This application is a continuation application of International Application No. PCT/CN2020/093508, filed on May 29, 2020, the content of which is incorporated herein by reference in its entirety.

TECHNICAL FIELD

The present disclosure relates to the technical field of image processing, and in particular to a method and an apparatus for aligning image frames, electronic device and storage medium.

BACKGROUND

With the widespread application of mobile terminal equipment, shooting and imaging technology has become more and more important. In order to obtain high-definition images, multi-frame fusion algorithms have emerged. Multi-frame fusion algorithm refers to the use of multiple low-quality images frames to enhance details and reduce noise to obtain higher quality images. Before fusion, it is necessary to ensure the corresponding relationship between the content of the multiple image frames, and the image quality may be improved by fusion when the content of the multiple image frames is consistent.

In practical applications, the time interval for the mobile terminal to obtain the multiple image frames is relatively short, but movement in the external scene and the shaking of the mobile terminal (caused by the user's hand shaking) may exist, so that the multiple image frames are not completely overlapped, that is, there is a certain translation and rotation relationship between them. Therefore, the premise of image fusion is to align multiple image frames.

In related art, the alignment process includes: 1. using Oriented FAST and Rotated BRIEF (ORB) to extract and select ORB feature points in images of different sizes, the selecting method being quadtree division based on corner response value and retaining final branch nodes, to obtain feature points with a wider distribution range and higher quality; 2. calculating descriptors of the feature points, and matching of feature points using the Hamming distance of the descriptors; 3. calculating a conversion matrix using the random sampling consensus (RANdom SAmple Consensus, RANSAC) algorithm with noise; 4. implementing image alignment with the conversion matrix. However, the accuracy and applicability of ORB algorithms may not be high enough.

SUMMARY

According to a first aspect of the embodiments of the present disclosure, a method of aligning image frames comprises: obtaining a plurality of original image frames, the plurality of original image frames comprising a reference image frame and a plurality of to-be-aligned image frames; obtaining a brightness image of the reference image frame and a brightness image of each of the to-be-aligned image frames; for each of the to-be-aligned image frames, obtaining at least one mapping model between the reference image frame and the to-be-aligned image frame based on the brightness image of the reference image frame and the brightness image of the to-be-aligned image frame; and aligning the to-be-aligned image frame with the reference image frame based on the at least one mapping model.

According to a second aspect of the embodiments of the present disclosure, an electronic device comprises: a processor; and a memory configured to store instructions executable by the processor, wherein the processor is configured to: obtain a plurality of original image frames, the plurality of original image frames comprising a reference image frame and a plurality of to-be-aligned image frames; obtain a brightness image of the reference image frame and a brightness image of each of the to-be-aligned image frames; for each of the to-be-aligned image frames, obtain at least one mapping model between the reference image frame and the to-be-aligned image frame based on the brightness image of the reference image frame and the brightness image of the to-be-aligned image frame; and align the to-be-aligned image frame with the reference image frame based on the at least one mapping model.

According to a third aspect of the embodiments of the present disclosure, a non-transitory computer-readable storage medium has stored thereon instructions that, when executed by a processor of a device, cause the device to perform: obtaining a plurality of original image frames, the plurality of original image frames comprising a reference image frame and a plurality of to-be-aligned image frames; obtaining a brightness image of the reference image frame and a brightness image of each of the to-be-aligned image frames; for each of the to-be-aligned image frames, obtaining at least one mapping model between the reference image frame and the to-be-aligned image frame based on the brightness image of the reference image frame and the brightness image of the to-be-aligned image frame; and aligning the to-be-aligned image frame with the reference image frame based on the at least one mapping model.

The technical solutions provided by the embodiments of the present disclosure may include the following beneficial effects.

In the embodiments of the present disclosure, multiple original image frames are obtained, and the multiple original image frames include a reference image frame and multiple to-be-aligned image frames. Then, the brightness image of the reference image frame and the brightness image of each of the to-be-aligned image frames are obtained. According to the brightness image of the reference image frame and the brightness image of each of the to-be-aligned image frames, a mapping model between the reference image frame and the to-be-aligned image frames is obtained; finally, each of the to-be-aligned image frames is aligned with the reference image frame based on the mapping model. In the embodiments, the mapping model is obtained based on the brightness images, which is robust to brightness and can meet the image alignment requirements of different brightness scenes, especially for extremely dark scenes.

It is to be understood that the above general description and the below detailed description are merely exemplary and explanatory, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

FIG. 2 is a flowchart illustrating a method of obtaining a brightness image according to an embodiment.

DETAILED DESCRIPTION OF THE EMBODIMENTS

Detailed description will be made here to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
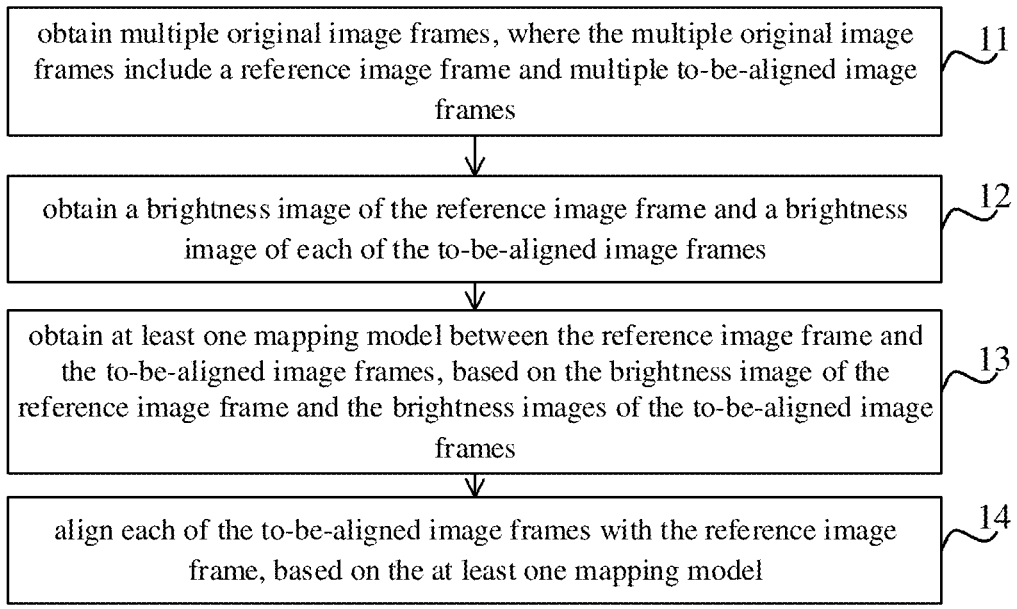
FIG. 1 is a flowchart illustrating a method of aligning image frames according to an embodiment.

FIG. 1 illustrates a method of aligning image frames according to an embodiment. The method may be used in an electronic device such as a smart phone, a tablet computer, a personal computer, and the like. Referring to FIG. 1, the method of aligning image frames includes steps 11 to 14.

In step 11, multiple original image frames are obtained, where the multiple original image frames include a reference image frame and multiple to-be-aligned image frames.

In the embodiment, the electronic device may be provided with a camera module, and the original images may be obtained through the camera module, such as a raw image in Bayer format (such as RGGB), or a JPEG (Joint Photographic Experts Group), which is not limited here, and the following embodiments take the original image in Bayer format as an example for description. In other embodiments, the electronic device may communicate with another storage device to obtain multiple original image frames stored on the storage device.

Taking into account the subsequent alignment operation, the electronic device may select one original image frame as the reference image frame from the multiple original image frames. The selection methods include but are not limited to: a first frame of the multiple original image frames, a highest-definition frame of the multiple original image frames, or a frame being randomly selected from the multiple original image frames. Alternatively, the electronic device may select an original image corresponding to the configuration parameter as the reference image frame according to the configuration of the user. After the reference image frame is determined, the remaining frames may be determined as to-be-aligned image frames.

In step 12, a brightness image of the reference image frame and a brightness image of each of the to-be-aligned image frames are obtained.

In the embodiments, the electronic device may separately obtain the brightness image of the reference image frame and the brightness image of the to-be-aligned image frames. Referring to FIG. 2, in step 21, for the reference image frame and each of the to-be-aligned image frames, the electronic device may obtain an average value of the gray values of pixels in each Bayer unit of each image. In other embodiments, the electronic device may obtain the weighted average of the gray values of pixels in each Bayer unit, and an appropriate solution can be selected according to the specific scenario. In step 22, the electronic device may obtain the brightness image of each image by taking an average value corresponding to each Bayer unit as a gray value of a pixel. In other words, in the embodiments, one pixel in the brightness image corresponds to one Bayer unit of the original image, which can reduce the size of the original image and reduce the amount of calculation. In addition, by obtaining the average value, the brightness image may only contain brightness information, which may improve the signal-to-noise ratio of the brightness image, helpful to improve the accuracy and stability of the image alignment in the subsequent process.

In step 13, based on the brightness image of the reference image frame and the brightness images of the to-be-aligned image frames, at least one mapping model between the reference image frame and each of the to-be-aligned image frames is obtained.

Figure 3:
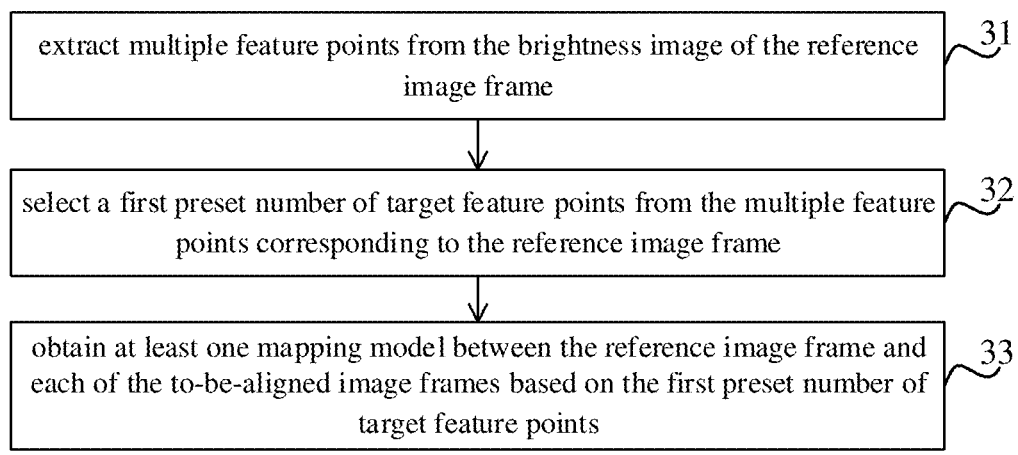
FIG. 3 is a flowchart illustrating a method of obtaining a conversion model according to an embodiment.

In the embodiments, referring to FIG. 3, the electronic device may obtain at least one mapping model between the reference image frame and the to-be-aligned image frames according to the brightness image of the reference image frame and the brightness images of the to-be-aligned image frames, including steps 31 to 33.

Figure 4:
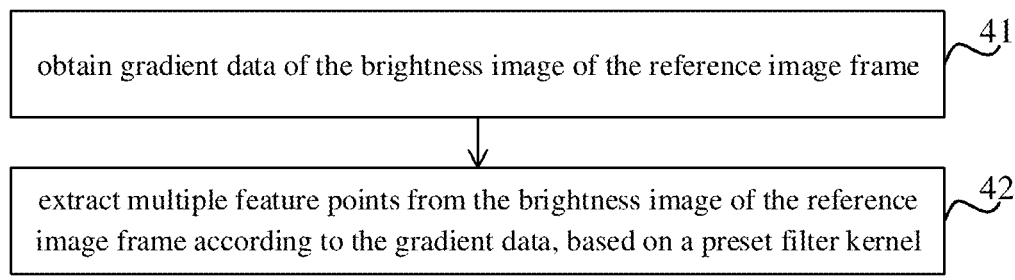
FIG. 4 is a flowchart illustrating a method of extracting feature points according to an embodiment.

In step 31, the electronic device may extract multiple feature points from the brightness image of the reference image frame. For example, referring to FIG. 4, in step 41, the electronic device may obtain gradient data of the brightness image of the reference image frame. The gradient data may include, but is not limited to, basic gradient, internal gradient, external gradient, and directional gradient. Then, in step 42, based on a preset filter kernel, the electronic device may extract multiple feature points from the brightness image of the reference image frame according to the gradient data. In this step, the size of the preset filter kernel can include 7*7 or 11*11. By adopting a larger filter kernel, the anti-noise ability of the feature points may be made strong. For another example, a suitable filter kernel can be selected according to the specific scene, the amount of calculation and the computing power of the hardware, which is not limited here.

In this step, the feature points may include but are not limited to Harris corner points and CSS corner points. For example, appropriate feature points can be selected according to specific scenarios, and the corresponding solutions fall within the protection scope of the present disclosure.

The gradient data obtained in this step may be calculated only once in the reference image frame, and there is no need to obtain the gradient data of the to-be-aligned image frames. Both of the calculation speed and accuracy may be guaranteed, and it is suitable for application scenes of mobile terminal devices such as mobile phones and tablets.

In step 32, the electronic device may select a first preset number of target feature points from the multiple feature points corresponding to the reference image frame. The selecting method may include one of the following: a quadtree method, an image even division method, and an image division method with the feature point closest distance limitation.

Figure 5:
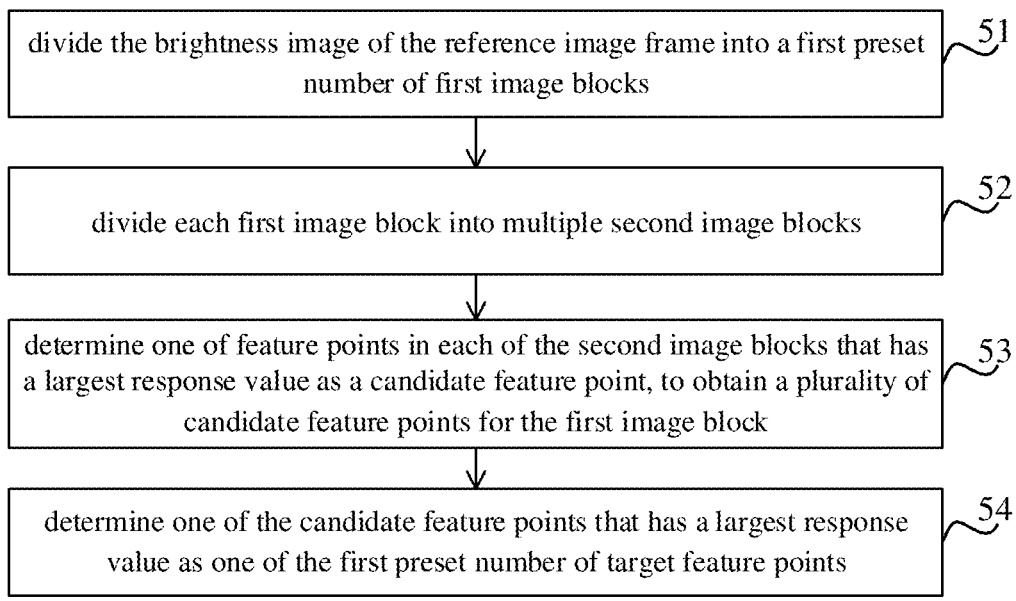
FIG. 5 is a flowchart illustrating a method of obtaining a first feature point set according to an embodiment.

Taking the image division method as an example, referring to FIG. 5, in step 51, the electronic device may divide the brightness image of the reference image frame into a first preset number of first image blocks. In step 52, the electronic device may continue to divide each first image block into multiple second image blocks. In step 53, the electronic device may determine one of feature points in each of the second image blocks that has a largest response value as a candidate feature point, to obtain a plurality of candidate feature points for the first image block. The maximum response value refers to a maximum sum or a maximum product of the gradient values of the feature points in two directions. In step 54, for each of the first image blocks, the electronic device may determine one of the candidate feature points that has a largest response value as one target feature point, to obtain the first preset number of target feature points which is same as the number of the first image blocks.

Figure 6A:
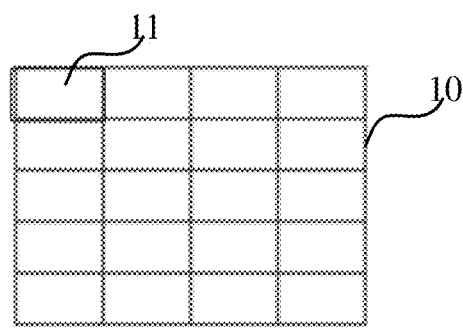
FIG. 6A is a schematic diagram illustrating an effect of equally dividing a brightness image, according to an embodiment.
Figure 6B:
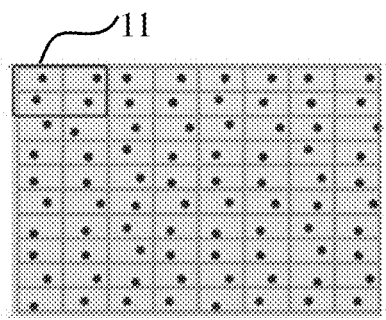
FIG. 6B is a schematic diagram illustrating an effect of equally dividing each first image block to obtain a first feature point set, according to an embodiment.
Figure 6C:
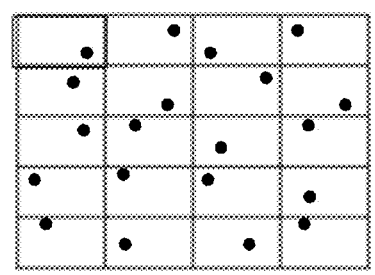
FIG. 6C is a schematic diagram illustrating a distribution of feature points in the first feature point set, according to an embodiment.

In an embodiment, the image division may be image even division. For example, the electronic device may divide the brightness image 10 of the reference image frame into multiple first image blocks 11 in an even and equal division manner, the effect of which is shown in FIG. 6A. In another embodiment, the electronic device may divide each first image block 11 into multiple second image blocks evenly, the effect of which is shown FIG. 6B. When both of the first image block and the second image block are obtained in an even and equal division manner, the first preset number of target feature points with the same number as the first image blocks as shown in FIG. 6C may be obtained.

The image even division method is adopted to make the distribution of the feature points more even, so that the first preset number of target feature points are evenly distributed in the reference image frame, avoiding the inaccurate alignment caused by uneven distribution of feature points. In other words, in this example, by dispersing the first preset number of target feature points, the target feature points may more accurately reflect the characteristics of the reference image frame, thereby improving the quality of extracting target feature points, which is conducive to improving the accuracy of the subsequent obtained mapping model.

In step 54, for each of the first image blocks, one of the candidate feature points that has a largest response value is determined as one target feature point, which means that one of feature points in each first image block is selected as one target feature point. In some embodiments, the target feature points in adjacent first image blocks may be very close to each other, for example, the target feature points in four adjacent first image blocks. In this case, a distance threshold (such as 30 pixels) may be set. When selecting the target feature point in each first image block, in addition to comparing the response values, it is also necessary to calculate the distance between the target feature points respectively in adjacent first image blocks. When the distance between the target feature points in two adjacent first image blocks exceeds the distance threshold, the target feature points may be regarded as effective target feature points, and achieve the effect of the closest distance limitation of the feature points. In this way, the first preset number of target feature points can reflect the characteristics of the reference image frame as much as possible, avoiding too many feature points reflecting the same feature, and improving the quality of the target feature points.

In some embodiments, when the size of the brightness image is large (that is, the size of the brightness image is greater than a size threshold (for example, 2000*1000 pixels), and the size threshold may be preset by the electronic device), there are multiple candidate feature points in each the first image block, and the candidate feature points may be ranked according to their response values. In an embodiment, the response values of the candidate feature points that are ranked at top (that is, the response values are larger) are greater than the response values of the candidate feature points that are ranked at bottom, and 2 or more feature points with the highest response values are selected as the target feature points, that is, a top preset number of feature points each having a larger response value are sequentially selected. Similar to the principle of selecting candidate feature points in step 53, the principle of subsequently selecting the second preset number of target feature points also adopts the mode. In an embodiment, in step 53 and step 54, while maintaining the selection of one candidate feature point or one target feature point for each image block, the number of divided blocks for the brightness image, that is, the number of the first image blocks, may be adjusted. The number of divided image blocks and the number of feature points selected for each image block may be determined according to specific scenarios. If the number of target feature points is sufficient and does not affect subsequent calculations, the corresponding solution falls within the protection scope of the present disclosure.

Figure 7:
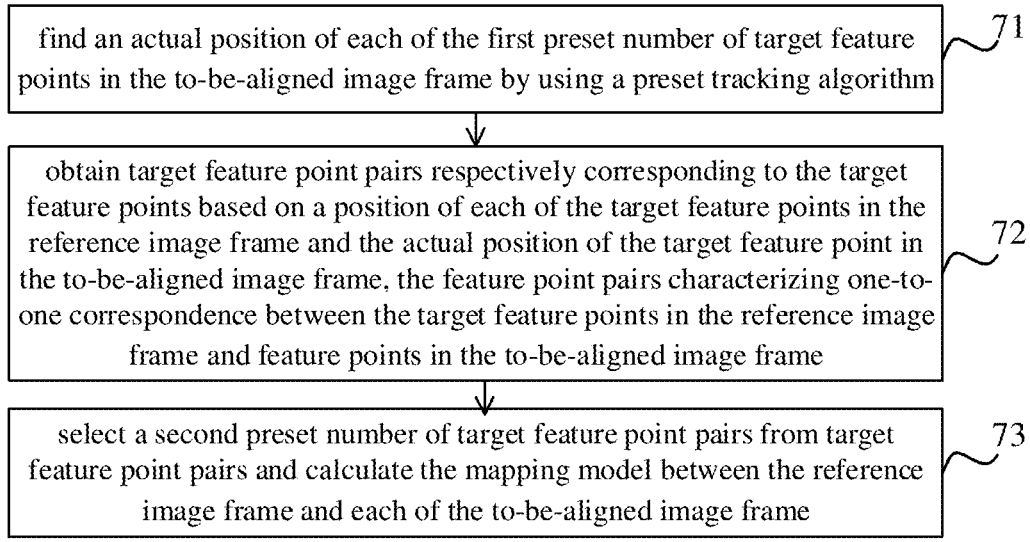
FIG. 7 is a flowchart illustrating a method of obtaining a mapping model according to an embodiment.

In step 33, the electronic device may obtain at least one mapping model between the reference image frame and each of the to-be-aligned image frames based on the first preset number of target feature points, as shown in FIG. 7.

In step 71, the electronic device may find an actual position of each of the first preset number of target feature points in the to-be-aligned image frame by using a preset tracking algorithm.

In an embodiment, the preset tracking algorithm can use KLT tracking algorithm (Kanade-Lucas-Tomasi Tracking Method), or block matching based on block match, or simple feature point matching based on FAST corner match, which is not limited herein.

In step 72, the electronic device may obtain target feature point pairs respectively corresponding to the target feature points based on a position of each of the target feature points in the reference image frame and the actual position of the target feature point in the to-be-aligned image frame, the feature point pairs characterizing one-to-one correspondence between the target feature points in the reference image frame and feature points in the to-be-aligned image frame.

The feature point pair refers to the position of the feature point on the reference image frame and the actual position on the to-be-aligned image, plus the label of the feature point to form a feature point combination, which characterizes a one-to-one correspondence between the target feature points in the reference image frame and feature points in each of the to-be-aligned image frames. For example for [5 (F1, 300, 500), (F2, 310, 490)], 5 (F1, 300, 500) indicates that the position of the fifth feature point on the reference image frame F1 is (300, 500), (F2, 310, 490) indicates that the position of the fifth feature point on the to-be-aligned image F2 is (310, 490), and the expression form of the feature point pairs may be set according to the specific scene, which is not limited here.

In some embodiments, considering the shaking of the electronic device or the movement of objects in the scene when the to-be-aligned image frames are captured, the preset tracking algorithm may not be able to track each target feature point of the first preset number of target feature points, so the number of feature point pairs will be less than the first preset number.

In an embodiment, in order to provide tracking speed, the offset may be obtained according to the size of the original image, such as the size*(−1.5%-1.5%) range. In one step, the offset is less than 50 pixels, and the number of pyramid layers is set in this case as follows. In still camera mode, size=12M (4000*3000) image size, the offset is maintained within the range of size*(−1.5%-1.5%), the transformed brightness image size is 3M, and the required number of pyramid layers is 2 layers. The number of pyramid layers refers to the number of brightness images that need to be used in the tracking process. Taking 2 layers as an example, the brightness images described above are continued to be compressed to obtain a 1.5M brightness images. At this time, the tracking range will be reduced by half. After the target feature points are determined, tracking is continued based on the determined target feature points back on the brightness image of 3M, until the accurate position of each target feature point on the 3M image is found.

In an embodiment, considering that the brightness of the original image in the Bayer format is low, the same brightening operation may be performed on the brightness image. For the brightness image of the original image under different exposure levels, it may be adjusted to the same brightness according to the brightness ratio of the reference image frame and the to-be-aligned image, or a low-brightness image thereof may be adjusted through the histogram equalization operation, which may be adapted to image alignment scenarios under different light levels.

In step 73, the electronic device may select a second preset number of target feature point pairs from target feature point pairs and calculate the mapping model between the reference image frame and each of the to-be-aligned image frame.

For example, the first preset number is set to 100, and the second preset number is set to 4. For the position A of the target feature point on the reference image frame, the electronic device may use the KLT tracking algorithm to find the actual position B of each target feature point from the to-be-aligned image. Assuming that 5 target feature points are not found but 95 target feature points are found, 95 target feature point pairs (i.e., A1~95, B1~95) may be obtained. Then, 4 out of 95 target feature point pairs are selected, and a 3*3 conversion matrix may be calculated according to the target feature point pairs (i.e., A1~4, B1~4), that is, the mapping model of the reference image frame and the to-be-aligned image is obtained.

Figure 8:
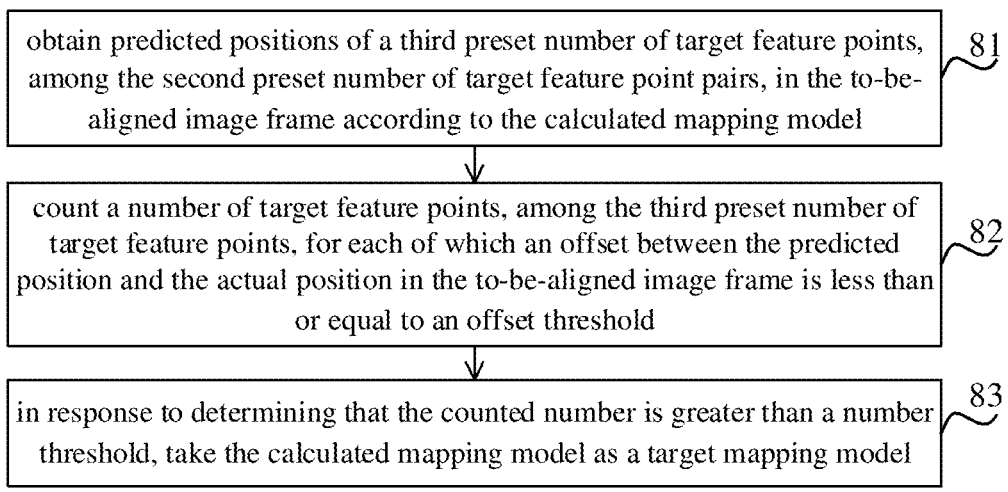
FIG. 8 is a flowchart illustrating a method of obtaining a mapping model according to an embodiment.

For another example, considering that the second preset number of target feature point pairs selected from the target feature point pairs may include many combinations, in this case, multiple mapping models may exist between the reference image frame and each of the to-be-aligned image frames. Therefore, this example may also include a step of selecting a mapping model. Referring to FIG. 8, in step 81, the electronic device may obtain predicted positions of a third preset number of target feature points, among the second preset number of target feature point pairs, in the to-be-aligned image frame according to the calculated mapping model. In step 82, the electronic device may count a number of target feature points, among the third preset number of target feature points, for each of which an offset between the predicted position and the actual position in the to-be-aligned image frame is less than or equal to an offset threshold. In step 83, the electronic device may, in response to determining that the counted number is greater than a number threshold, take the calculated mapping model as a final mapping model (i.e., a target mapping model).

For example, continuing to take the second preset number as 4 for an example, the electronic device may input the remaining 91 feature point pairs (all or part) into the 3*3 mapping model sequentially, and obtain the mapping model to calculate a predicted position B2 of the target feature point on the to-be-aligned image. Theoretically, the predicted position B2 and the actual position B should be coincident. In practice, there is an offset between the predicted position B2 and the actual position B. Then an offset threshold (such as 50 pixels) is set. If the offset between the predicted position B2 and the actual position B is less than or equal to the offset threshold, it means that the target feature point has passed the verification. When it is counted that the number of verified feature points exceeds a number threshold (such as 90), it indicates that the 3*3 mapping model is able to characterize the mapping relationship between the reference image frame and the to-be-aligned image frame.

In an embodiment, the electronic device may perform the method shown in FIG. 8 upon obtaining each mapping model. In another embodiment, the electronic device may select one mapping model after obtaining a certain number (such as 5, adjustable) of mapping models.

In some embodiments, the embodiments in step 73 and FIG. 8 may use a RANdom SAmple Consensus (RANSAC) algorithm in related technologies to estimate the mapping model. When the matching quality of some feature points is low, the time complexity of the RANSAC algorithm will increase significantly. In this case, the RANSAC algorithm may be modified, for example, the randomly selected target feature points are modified to select the target feature points sequentially, such as sorting the target feature points according to the response values of the feature points from large to small. Since the larger the response value, the higher the quality of the target feature point, it is possible to choose to sort the top several or top dozens of high-quality target feature points, which is beneficial to reduce the amount of calculation. A selection can be made according to the specific scenario, which is not limited here.

In the embodiments, since the quality of the feature points extracted in step 13 is relatively high, and the tracking performance of the KLT tracking algorithm is relatively stable, the quality of the obtained target feature point set is also relatively high and stable, therefore, the mapping model may be obtained through a small amount of calculation, which is beneficial to reduce the amount of calculation and meet the needs of fast calculation of electronic device. In some embodiments, algorithms with faster feature point extraction speed may be used to replace the KLT tracking algorithm, which may further improve the calculation speed, and the corresponding solutions fall within the protection scope of the present disclosure.

Referring back to FIG. 1, in step 14, based on the at least one mapping model, each of the to-be-aligned image frames is aligned with the reference image frame.

Figure 9:
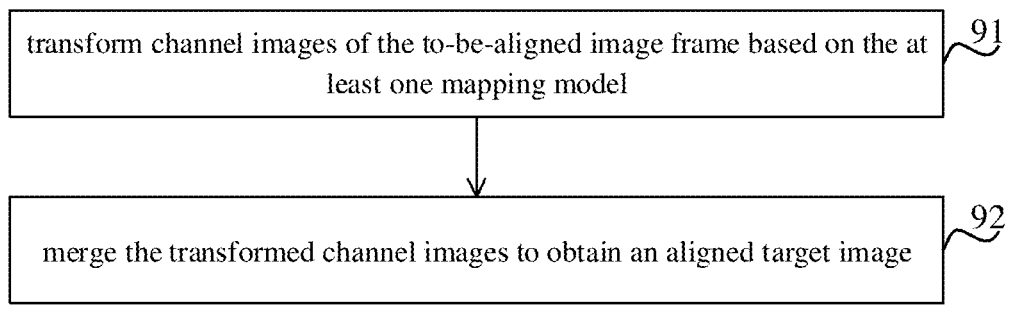
FIG. 9 is a flowchart illustrating a method of an image alignment method according to an embodiment.

In the embodiments, referring to FIG. 9, in step 91, the electronic device may obtain each channel image of each of the to-be-aligned image frames, such as R, G, G, and B channel images, and transform channel images of the to-be-aligned image frame based on the above mapping model. In the image conversion process, linear interpolation methods such as nearest neighbor interpolation are employed, but bilinear interpolation and bicubic interpolation are not recommended, which can protect the linear relationship of raw original data from being damaged. In step 92, the electronic device may merge the channel images transformed in step 91 to obtain an aligned target image. As such, in the embodiments, each channel image in the to-be-aligned image is aligned with each channel image in the reference image frame.

In an embodiment, the electronic device may directly align the to-be-aligned image frames based on the mapping model. Due to the robustness of the above mapping model, the alignment effect may be stable.

In the above embodiments, multiple original image frames are obtained, and the multiple original image frames include a reference image frame and multiple to-be-aligned image frames. Then, the brightness image of the reference image frame and the brightness image of each of the to-be-aligned image frames are obtained. According to the brightness image of the reference image frame and the brightness image of each of the to-be-aligned image frames, a mapping model between the reference image frame and the to-be-aligned image frames is obtained; then, each of the to-be-aligned image frames is aligned with the reference image frame based on the mapping model. In the embodiments, the mapping model is obtained based on the brightness images, which is robust to brightness and may meet the image alignment requirements of different brightness scenes, especially for extremely dark scenes.

Figure 10:
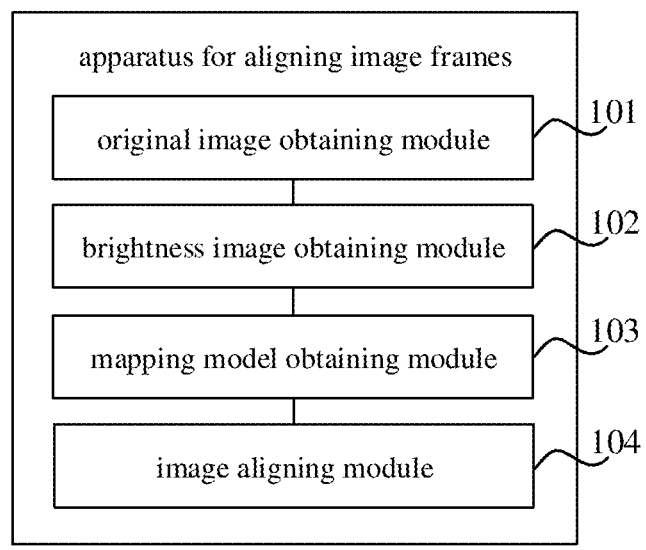
FIGS. 10 to 17 are block diagrams illustrating an apparatus for aligning image frames according to an embodiment.

FIG. 10 is a block diagram illustrating an apparatus for aligning image frames according to an embodiment. Referring to FIG. 10, the apparatus for aligning image frames includes the following modules.

The original image obtaining module 101 is configured to obtain a plurality of original image frames, the plurality of original image frames including a reference image frame and a plurality of to-be-aligned image frames.

The brightness image obtaining module 102 is configured to obtain a brightness image of the reference image frame and a brightness image of each of the to-be-aligned image frames.

The mapping model obtaining module 103 is configured to for each of the to-be-aligned image frames, obtaining at least one mapping model between the reference image frame and the to-be-aligned image frame based on the brightness image of the reference image frame and the brightness image of the to-be-aligned image frame.

The image aligning module 104 is configured to align the to-be-aligned image frame with the reference image frame based on the at least one mapping model.

Figure 11:
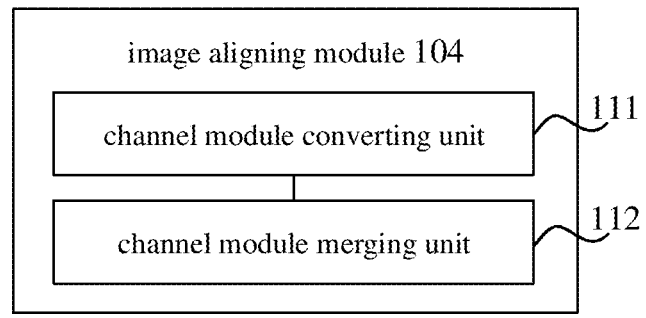

In an embodiment, referring to FIG. 11, the image aligning module 104 includes: a channel module transforming unit 111 and a channel module merging unit 112.

The channel module transforming unit 111 is configured to transform channel images of the to-be-aligned image frame based on the at least one mapping model.

The channel module merging unit 112 is configured to merge the transformed channel images to obtain an aligned target image.

Figure 12:
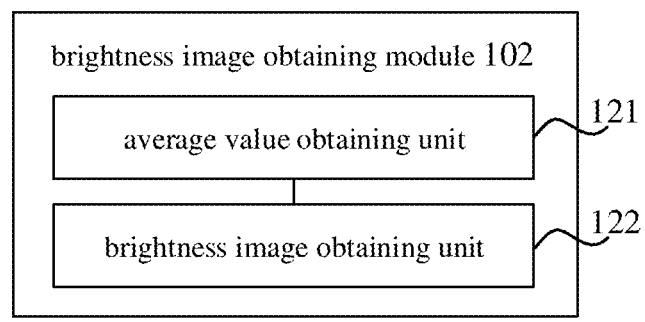

In an embodiment, referring to FIG. 12, the brightness image obtaining module 102 includes: an average value obtaining unit 121 and a brightness image obtaining unit 122.

The average value obtaining unit 121 is configured to, obtain an average value of gray values of pixels in each Bayer unit of the reference image frame, and obtain an average value of gray values of pixels in each Bayer unit of the to-be-aligned image frame.

The brightness image obtaining unit 122 is configured to obtain the brightness image of the reference image frame by taking the average value of gray values of pixels in each Bayer unit of the reference image frame as a gray value of a pixel in the brightness image of the reference image frame, and obtain the brightness image of to-be-aligned image frame by taking the average value of gray values of pixels in each Bayer unit of the to-be-aligned image frame as a gray value of a pixel in the brightness image of the to-be-aligned image frame.

Figure 13:
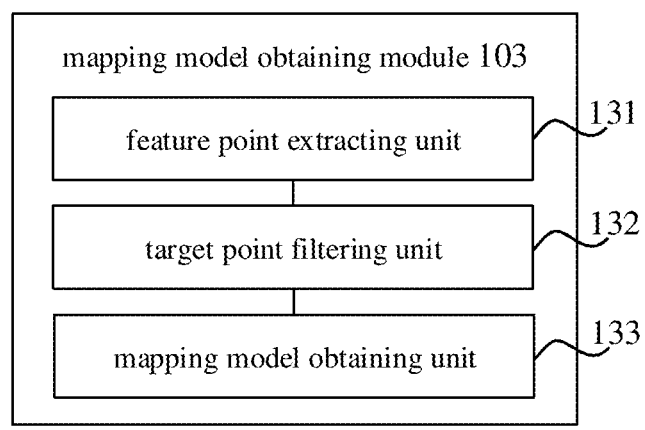

In an embodiment, referring to FIG. 13, the mapping model obtaining module 103 includes: a feature point extracting unit 131, a target point filtering unit 132 and a mapping model obtaining unit 133.

The feature point extracting unit 131 is configured to extract a plurality of feature points from the brightness image of the reference image frame, The target point filtering unit 132 is configured to select a first preset number of target feature points from the plurality of feature points corresponding to the reference image frame.

The mapping model obtaining unit 133 is configured to obtain the at least one mapping model between the reference image frame and the to-be-aligned image frame based on the first preset number of target feature points.

Figure 14:
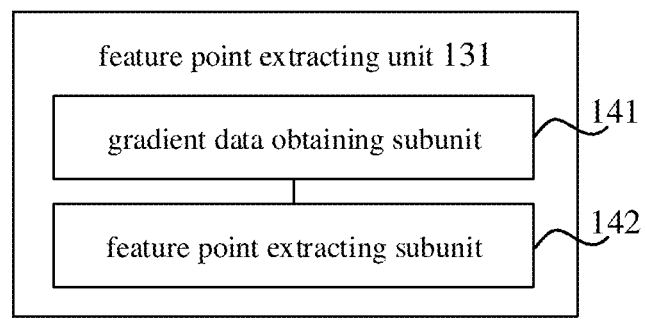

In an embodiment, referring to FIG. 14, the feature point extracting unit 131 includes: a gradient data obtaining subunit 141 and a feature point extracting subunit 142.

The gradient data obtaining subunit 141 is configured to obtain gradient data of the brightness image of the reference image frame.

The feature point extracting subunit 142 is configured to extract, the plurality of feature points from the brightness image of the reference image frame according to the gradient data by using a preset filter kernel.

Figure 15:
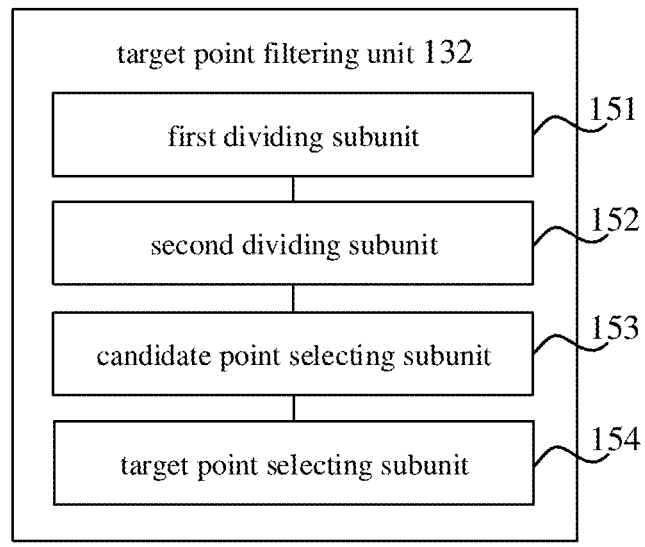

In an embodiment, referring to FIG. 15, the target point filtering unit 132 includes: a first dividing subunit 151, a second dividing subunit 152, a candidate point selecting subunit 153, and a target point selecting subunit 154.

The first dividing subunit 151 is configured to divide the brightness image of the reference image frame into a first preset number of first image blocks.

The second dividing subunit 152 is configured to, for each of the first image blocks, divide the first image block into a plurality of second image blocks.

The candidate point selecting subunit 153 is configured to select one of feature points in each of the second image blocks that has a largest response value as a candidate feature point, to obtain a plurality of candidate feature points for the first image block.

The target point selecting subunit 154 is configured to select one of the candidate feature points that has a largest response value as one of first preset number of target feature points.

Figure 16:
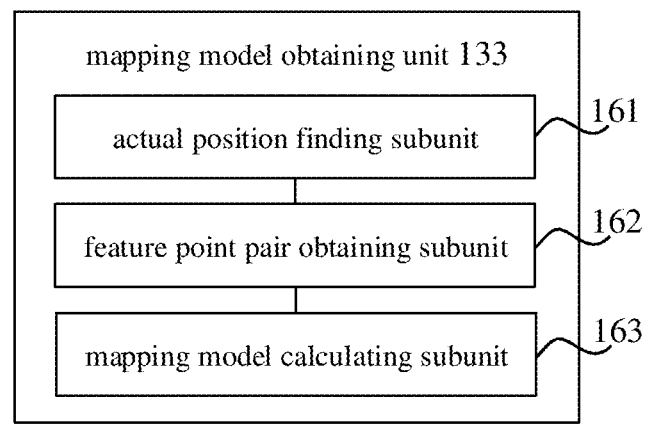

In an embodiment, referring to FIG. 16, the mapping model obtaining unit 133 includes: an actual position finding subunit 161, a feature point pair obtaining subunit 162 and a mapping model calculating subunit 163.

The actual position finding subunit 161 is configured to find an actual position of each of the first preset number of target feature points in the to-be-aligned image frame by using a preset tracking algorithm.

The feature point pair obtaining subunit 162 is configured to obtain target feature point pairs respectively corresponding to the target feature points, based on a position of each of the target feature points in the reference image frame and the actual position of the target feature point in the to-be-aligned image frame; the feature point pairs characterizing a one-to-one correspondence between the target feature points in the reference image frame and feature points in the to-be-aligned image frame.

The mapping model calculating subunit 163 is configured to select a second preset number of the obtained target feature point pairs from target feature point pairs, and calculating the mapping model between the reference image frame and the to-be-aligned image.

Figure 17:
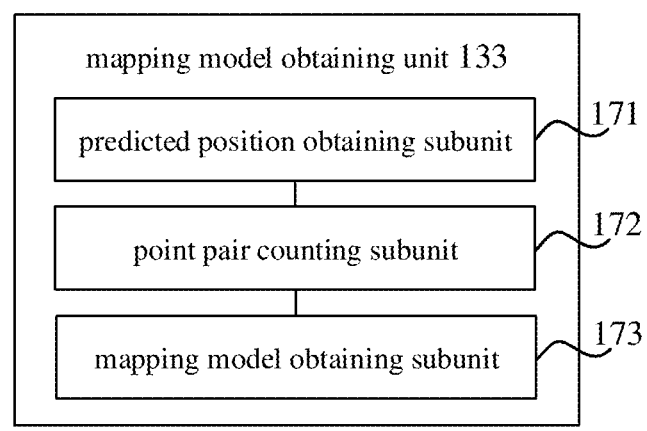

In an embodiment, referring to FIG. 17, the mapping model obtaining unit 133 further includes: a predicted position obtaining subunit 171, a point pair counting subunit 172 and a mapping model obtaining subunit 173.

The predicted position obtaining subunit 171 configured to obtain respective predicted positions of a third preset number of target feature points, among the second preset number of target feature point pairs, in the to-be-aligned image frame, according to the calculated mapping model;

The point pair counting subunit 172 is configured to count a number of target feature points, among the third preset number of target feature points, for each of which an offset between the predicted position and the actual position in the to-be-aligned image frame is less than or equal to an offset threshold;

The mapping model obtaining subunit 173 is configured to, in response to determining that the counted number is greater than a number threshold, taking the calculated mapping model as a target mapping model.

In an embodiment, the mapping model obtaining unit further includes: a brightness adjustment subunit configured to adjust brightness of the brightness image of the to-be-aligned image frame according to a brightness ratio or histogram equalization.

In one embodiment, selecting the second preset number of target feature point pairs comprises one of, randomly selecting the second preset number of target feature point pairs from the obtained target feature point pairs; and sorting the obtained feature point pairs according to respective response values thereof, and sequentially selecting a top preset number of feature point pairs each having a larger response value from the sorted feature point pairs.

The apparatus in the embodiments corresponds to the above method embodiments, and for detailed operations of each module or unit in the apparatus, reference may be made to the description of the method embodiments, which will not be repeated here.

Figure 18:
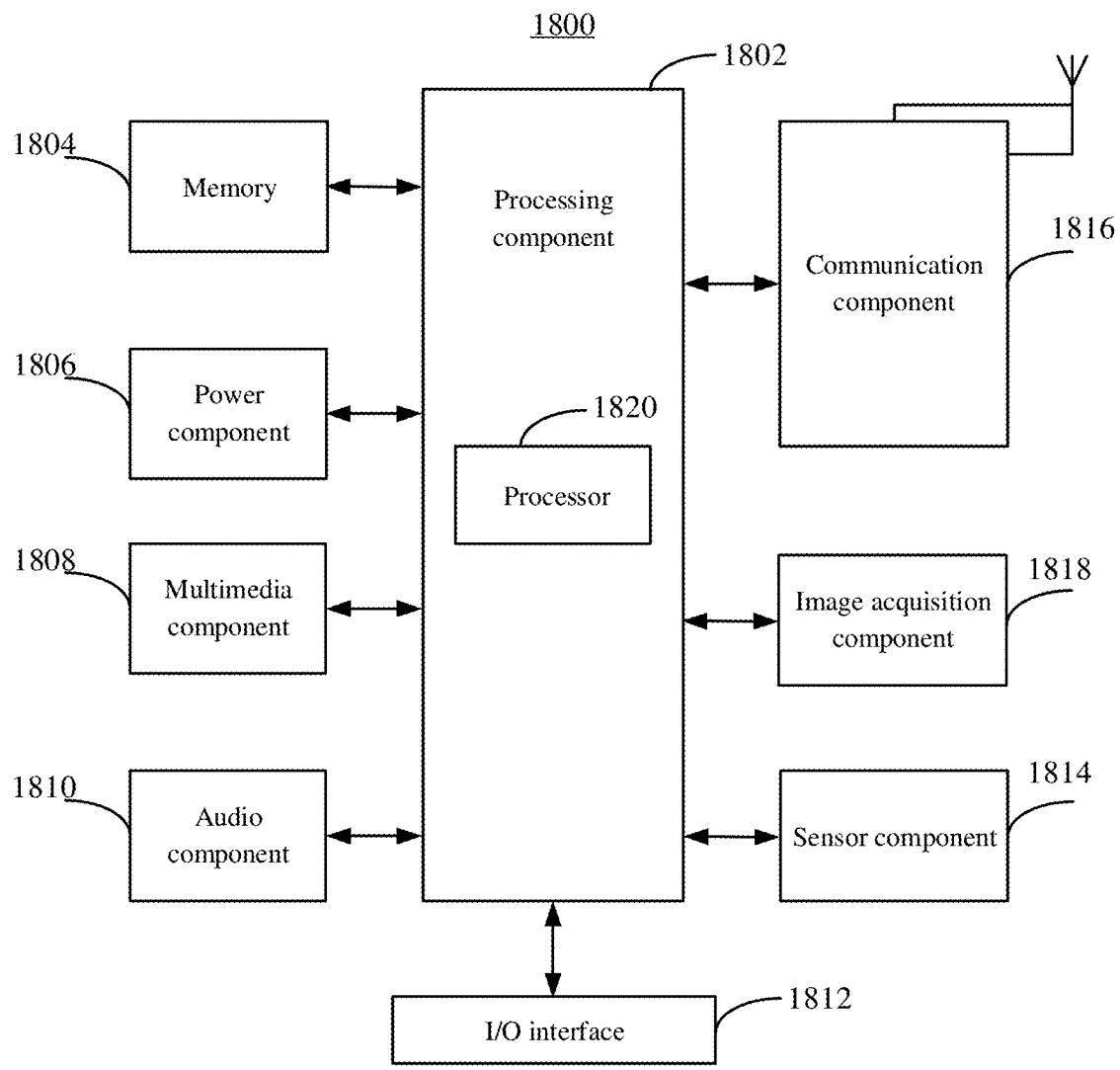
FIG. 18 is a block diagram illustrating an electronic device according to an embodiment.

FIG. 18 is a block diagram illustrating an electronic device 1800 according to an embodiment. For example, the electronic device 1800 may be a smart mobile phone, a computer, a digital broadcasting terminal, a tablet device, a medical device, fitness equipment, a personal digital assistant, or the like.

As shown in FIG. 18, the electronic device 1800 can include one or more of the following components: a processing component 1802, a memory 1804, a power supply component 1806, a multimedia component 1808, an audio component 1810, an input/output (I/O) interface 1812, a sensor component 1814, and a communication component 1816.

The processing component 1802 generally controls overall operations of the electronic device 1800, such as operations associated with display, phone calls, data communications, camera operations, and recording operations. The processing component 1802 can include one or more processors 1820 to execute a computer program. In addition, the processing component 1802 can include one or more modules which facilitate the interaction between the processing component 1802 and other components. For example, the processing component 1802 can include a multimedia module to facilitate the interaction between the multimedia component 1808 and the processing component 1802.

The memory 1804 is to store various types of data to support the operation of the electronic device 1800. Examples of such data include computer programs for any application or method operated on the electronic device 1800, contact data, phonebook data, messages, pictures, videos, and so on. The memory 1804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1806 supplies power for different components of the electronic device 1800. The power supply component 1806 can include a power supply management system, one or more power supplies, and other components associated with generating, managing and distributing power for the electronic device 1800. The power supply component 1806 may include a power supply chip, and the controller may communicate with the power supply chip to control the power supply chip to turn on or off the switching device, so that the battery supplies power or does not supply power to the main board circuit.

The multimedia component 1808 includes a screen providing an output interface between the electronic device 1800 and a target subject. In some examples, the screen can include a Liquid Crystal Display (LCD) and a Touch Panel (TP). If the screen includes the TP, the screen may be implemented as a touch screen to receive input signals from the target subject. The TP can include one or more touch sensors to sense touches, swipes, and gestures on the TP. The touch sensors can not only sense a boundary of a touch or swipe, but also sense a duration and a pressure associated with the touch or swipe.

The audio component 1810 is to output and/or input an audio signal. For example, the audio component 1810 includes a microphone (MIC). When the electronic device 1800 is in an operating mode, such as a call mode, a record mode and a voice recognition mode, the microphone is to receive an external audio signal. The received audio signal may be further stored in the memory 1804 or sent via the communication component 1816. In some examples, the audio component 1810 further includes a speaker for outputting an audio signal.

The I/O interface 1812 provides an interface between the processing component 1802 and a peripheral interface module. The above peripheral interface module may be a keyboard, a click wheel, buttons, or the like.

The sensor component 1814 includes one or more sensors to provide status assessments of various aspects for the electronic device 1800. For example, the sensor component 1814 can detect the on/off status of the electronic device 1800, and relative positioning of component, for example, the component is a display and a keypad of the electronic device 1800. The sensor component 1814 can also detect a change in position of the electronic device 1800 or a component of the electronic device 1800, a presence or absence of the contact between a target subject and the electronic device 1800, an orientation or an acceleration/deceleration of the electronic device 1800, and a change in temperature of the electronic device 1800.

The communication component 1816 is to facilitate wired or wireless communication between the electronic device 1800 and other devices. The electronic device 1800 can access a wireless network based on a communication standard, such as Wi-Fi, 4G or 5G, or a combination thereof. In an embodiment, the communication component 1816 receives a broadcast signal or broadcast related information from an external broadcast management system via a broadcast channel. In an embodiment, the communication component 1816 can further include a Near Field Communication (NFC) module for promoting short-range communication. In an embodiment, the communication component 1816 may be implemented based on a radio frequency identification (RFID) technology, an infrared data association (IrDA) technology, an ultra-wideband (UWB) technology, a Bluetooth® (BT) technology and other technologies.

The electronic device 1800 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components.

In an embodiment, a non-transitory readable storage medium including an executable computer program is further provided, such as the memory 1804 including instructions. When the instructions are executed by a processor of a device, the device may be caused to perform the above described methods. For example, the storage medium may be a Read-Only Memory (ROM), a Random Access Memory (RAM), a CD-ROM, a magnetic tape, a floppy disk, an optical data storage device, and so on.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:

1. A method of aligning image frames, comprising:
   obtaining a plurality of original image frames, the plurality of original image frames comprising a reference image frame and a plurality of to-be-aligned image frames;
   obtaining a brightness image of the reference image frame and a brightness image of each of the to-be-aligned image frames;
   for each of the to-be-aligned image frames, obtaining at least one mapping model between the reference image frame and the to-be-aligned image frame based on the brightness image of the reference image frame and the brightness image of the to-be-aligned image frame; and
   aligning the to-be-aligned image frame with the reference image frame based on the at least one mapping model,
   wherein the obtaining of the at least one mapping model between the reference image frame and the to-be-aligned image frame based on the brightness image of the reference image frame and the brightness images of the to-be-aligned image frame comprises:
   extracting a plurality of feature points from the brightness image of the reference image frame;
   selecting a first preset number of target feature points from the plurality of feature points corresponding to the reference image frame; and
   obtaining the at least one mapping model between the reference image frame and the to-be-aligned image frame based on the first preset number of target feature points.

2. The method according to claim 1, wherein the aligning of the to-be-aligned image frame with the reference image frame based on the at least one mapping model comprises:
   transforming channel images of the to-be-aligned image frame based on the at least one mapping model; and
   merging the transformed channel images to obtain an aligned target image.

3. The method according to claim 1, wherein the obtaining of the brightness image of the reference image frame and the brightness image of each of the to-be-aligned image frames comprises:
   obtaining the brightness image of the reference image frame by taking an average value of gray values of pixels in each Bayer unit of the reference image frame as a gray value of a pixel in the brightness image of the reference image frame; and
   obtaining the brightness image of the to-be-aligned image frame by taking an average value of gray values of pixels in each Bayer unit of the to-be-aligned image frame as a gray value of a pixel in the brightness image of the to-be-aligned image frame.

4. The method of claim 1, wherein the extracting of the plurality of feature points from the brightness image of the reference image frame comprises:
   obtaining gradient data of the brightness image of the reference image frame; and
   extracting the plurality of feature points from the brightness image of the reference image frame according to the gradient data by using a preset filter kernel.

5. The method according to claim 1, wherein the selecting of the first preset number of target feature points from the plurality of feature points corresponding to the reference image frame comprises:
   dividing the brightness image of the reference image frame into the first preset number of first image blocks; and
   for each of the first image blocks,
      dividing the first image block into a plurality of second image blocks;
      determining a feature point in each of the second image blocks that has a largest response value as a candidate feature point, to obtain a plurality of candidate feature points for the first image block; and determining one of the candidate feature points that has a largest response value as one of the first preset number of target feature points.

6. The method according to claim 1, wherein the obtaining of the at least one mapping model between the reference image frame and the to-be-aligned image frame based on the first preset number of target feature points comprises:
    finding an actual position of each of the first preset number of target feature points in the to-be-aligned image frame by using a preset tracking algorithm;
    obtaining target feature point pairs respectively corresponding to the target feature points based on a position of each of the target feature points in the reference image frame and the actual position of the target feature point in the to-be-aligned image frame, the feature point pairs characterizing one-to-one correspondence between the target feature points in the reference image frame and feature points in the to-be-aligned image frame; and
    selecting a second preset number of target feature point pairs from the obtained target feature point pairs, to calculate the at least one mapping model between the reference image frame and the to-be-aligned image frame.

7. The method according to claim 6, wherein the obtaining of the at least one mapping model between the reference image frame and the to-be-aligned image frame based on the first preset number of target feature points further comprises:
    obtaining respective predicted positions of a third preset number of target feature points, among the second preset number of target feature point pairs, in the to-be-aligned image frame according to the calculated mapping model;
    counting a number of target feature points, among the third preset number of target feature points, for each of which an offset between the predicted position and the actual position in the to-be-aligned image frame is less than or equal to an offset threshold; and
    in response to determining that the counted number is greater than a number threshold, taking the calculated mapping model as a target mapping model.

8. The method of claim 6, further comprising:
    prior to finding the actual position of each of the first preset number of target feature points in the to-be-aligned image frame by using the preset tracking algorithm, adjusting brightness of the brightness image of the to-be-aligned image frame according to a brightness ratio or histogram equalization.

9. The method according to claim 6, wherein the selecting of the second preset number of target feature point pairs comprises one of:
    randomly selecting the second preset number of target feature point pairs from the obtained target feature point pairs; or
    sorting the obtained feature point pairs according to respective response values thereof, and sequentially selecting a top preset number of feature point pairs each having a larger response value from the sorted feature point pairs.

10. An electronic device, comprising:
    a processor; and
    a memory configured to store instructions executable by the processor,
    wherein the processor is configured to:
        obtain a plurality of original image frames, the plurality of original image frames comprising a reference image frame and a plurality of to-be-aligned image frames;
        obtain a brightness image of the reference image frame and a brightness image of each of the to-be-aligned image frames;
        for each of the to-be-aligned image frames, obtain at least one mapping model between the reference image frame and the to-be-aligned image frame based on the brightness image of the reference image frame and the brightness image of the to-be-aligned image frame; and
        align the to-be-aligned image frame with the reference image frame based on the at least one mapping model,
    wherein the processor is further configured to:
        extract a plurality of feature points from the brightness image of the reference image frame;
        select a first preset number of target feature points from the plurality of feature points corresponding to the reference image frame; and
        obtain the at least one mapping model between the reference image frame and the to-be-aligned image frame based on the first preset number of target feature points.

11. The device according to claim 10, wherein the processor is further configured to:
    transform channel images of the to-be-aligned image frame based on the at least one mapping model; and
    merge the transformed channel images to obtain an aligned target image.

12. The device according to claim 10, wherein the processor is further configured to:
    obtain the brightness image of the reference image frame by taking an average value of gray values of pixels in each Bayer unit of the reference image frame as a gray value of a pixel in the brightness image of the reference image frame; and
    obtain the brightness image of to-be-aligned image frame by taking an average value of gray values of pixels in each Bayer unit of the to-be-aligned image frame as a gray value of a pixel in the brightness image of the to-be-aligned image frame.

13. The device according to claim 10, wherein the processor is further configured to:
    obtain gradient data of the brightness image of the reference image frame; and
    extract the plurality of feature points from the brightness image of the reference image frame according to the gradient data by using a preset filter kernel.

14. The device according to claim 10, wherein the processor is further configured to:
    divide the brightness image of the reference image frame into a first preset number of first image blocks;
    for each of the first image blocks,
        divide the first image block into a plurality of second image blocks;
        determine a feature point in each of the second image blocks that has a largest response value as a candidate feature point, to obtain a plurality of candidate feature points for the first image block; and
        determine one of the candidate feature points that has a largest response value as one of first preset number of target feature points.

15. The device according to claim 10, wherein the processor is further configured to:

find an actual position of each of the first preset number of target feature points in the to-be-aligned image frame by using a preset tracking algorithm;

obtain target feature point pairs respectively corresponding to the target feature points, based on a position of each of the target feature points in the reference image frame and the actual position of the target feature point in the to-be-aligned image frame; the feature point pairs characterizing a one-to-one correspondence between the target feature points in the reference image frame and feature points in the to-be-aligned image frame; and select a second preset number of target feature point pairs from the obtained target feature point pairs, and calculate the at least one mapping model between the reference image frame and the to-be-aligned image.

16. The device according to claim 15, wherein the processor is further configured to:

obtain respective predicted positions of a third preset number of target feature points, among the second preset number of target feature point pairs, in the to-be-aligned image frame, according to the calculated mapping model;

count a number of target feature points, among the third preset number of target feature points, for each of which an offset between the predicted position and the actual position in the to-be-aligned image frame is less than or equal to an offset threshold; and in response to determining that the counted number is greater than a number threshold, take the calculated mapping model as a target mapping model.

17. The device according to claim 15, wherein the processor is further configured to:

adjust brightness of the brightness image of the to-be-aligned image frame according to a brightness ratio or histogram equalization.

18. A non-transitory computer-readable storage medium having stored thereon instructions that, when executed by a processor of a device, cause the device to perform:

obtaining a plurality of original image frames, the plurality of original image frames comprising a reference image frame and a plurality of to-be-aligned image frames;

obtaining a brightness image of the reference image frame and a brightness image of each of the to-be-aligned image frames;

for each of the to-be-aligned image frames, obtaining at least one mapping model between the reference image frame and the to-be-aligned image frame based on the brightness image of the reference image frame and the brightness image of the to-be-aligned image frame; and aligning the to-be-aligned image frame with the reference image frame based on the at least one mapping model, wherein the obtaining of the at least one mapping model between the reference image frame and the to-be-aligned image frame based on the brightness image of the reference image frame and the brightness images of the to-be-aligned image frame comprises:

extracting a plurality of feature points from the brightness image of the reference image frame;

selecting a first preset number of target feature points from the plurality of feature points corresponding to the reference image frame; and obtaining the at least one mapping model between the reference image frame and the to-be-aligned image frame based on the first preset number of target feature points.

* * * * *